(12) United States Patent
Posa et al.

(10) Patent No.: US 6,633,741 B1
(45) Date of Patent: Oct. 14, 2003

(54) RECAP, SUMMARY, AND AUXILIARY INFORMATION GENERATION FOR ELECTRONIC BOOKS

(76) Inventors: John G. Posa, 1204 Harbrooke, Ann Arbor, MI (US) 48103; Barry H. Schwab, 5298 Cedarhurst, West Bloomfield, MI (US) 48322

( * ) Notice: Subject to any disclaimer, the term of this patent is extended or adjusted under 35 U.S.C. 154(b) by 0 days.

(21) Appl. No.: 09/900,781

(22) Filed: Jul. 6, 2001

Related U.S. Application Data

(60) Provisional application No. 60/219,381, filed on Jul. 19, 2000.

(51) Int. Cl.$^7$ .................................................. G09B 5/00
(52) U.S. Cl. ....................................................... 434/317
(58) Field of Search ................................ 434/317, 185, 434/365, 116, 118, 156, 169, 308; 345/124, 121

(56) References Cited

U.S. PATENT DOCUMENTS

| | | | | |
|---|---|---|---|---|
| 5,534,888 A | * | 7/1996 | Lebby et al. ................ | 345/672 |
| 5,713,741 A | * | 2/1998 | DeMars ....................... | 434/319 |
| 5,774,109 A | * | 6/1998 | Winksy et al. ............... | 345/169 |
| 5,991,594 A | * | 11/1999 | Froeber et al. .............. | 345/901 |

* cited by examiner

*Primary Examiner*—Henry C. Yuen
*Assistant Examiner*—Hyder Ali
(74) *Attorney, Agent, or Firm*—Gifford, Krass, Groh, Sprinkle, Anderson & Citkowski, PC

(57) ABSTRACT

Enhancements improve the use and enjoyment of electronic books, particularly those having both a viewing and audio enunciation capability. According to one aspect of the invention, a user control is provided enabling a reader to receive a "recap" up to a point designated by the reader or, alternatively, allow the reader to "finish the book" by being provided with a summary, covering the material from a given point to the end. A pointing device such as a touch pad may be provided along with curser on the display, enabling a reader to click on words for additional information, such as the definition of the word, the meaning of the word in context, or, in the case of a pronoun or personal pronoun, information about a character in the story, such as a family tree or genealogy. When material of any kind is "read" to a user, be it the text of the electronic book itself or the recap/summary/auxiliary information, the invention may be used to automatically display images on the display screen associated with the material being read, to better understand, or to better enjoy, the electronic book. As yet a further option, the book may be provided with a communications link or a short-range radio transmitter, such as a low-power FM transmitter, enabling a book which is presented as read out loud to instead be transmitted to a radio receiver in a car, for example, enabling all of the occupants thereof to enjoy the reading through a higher-quality audio system.

6 Claims, 2 Drawing Sheets

RECAP, SUMMARY, AND AUXILIARY INFORMATION GENERATION FOR ELECTRONIC BOOKS

REFERENCE TO RELATED APPLICATION

This application claims priority from U.S. provisional application Ser. No. 60/219,381, filed Jul. 19, 2000, the entire contents of which is incorporated herein by reference.

FIELD OF THE INVENTION

This invention relates generally to electronic books, and more particularly, to methods and apparatus whereby auxiliary information, either user requested or automatically generated, is supplied to enhance an electronic book reading experience.

BACKGROUND OF THE INVENTION

With the advent of lightweight, low-power mass storage media and efficient, high-resolution display technology, electronic books are becoming increasingly viable and popular. By "electronic," it is meant a portable device having a display and means for storing at least the text of a book so that a user can refer to this device and alter the display to effect page turning, and other operations. In addition to a textual or graphical display, future units also will include the ability to read the book to a user, if so desired, thereby providing a more modern version of a "book on tape."

In terms of the ways in which the reading material is loaded into the book, various techniques have been proposed. On the one hand, electronic book material may be provided in the form of an optical medium such as a compact disc or semiconductor memory module. Alternatively, such material may be downloaded from a website over the internet and stored in part, or in whole, temporarily or permanently.

SUMMARY OF THE INVENTION

This invention is directed to certain enhancements to electronic books, particularly those having both a viewing and audio enunciation capability. For example, according to one aspect of the invention, a user control is provided enabling a reader to receive a "recap" up to a point designated by the reader or, alternatively, allow the reader to "finish the book" by being provided with a summary, covering the material from a given point to the end. Such recap/summary information may be in the form of a displayed synopsis or spoken audio output.

According to a different aspect of the invention, a pointing device such as a touch pad is provided along with curser on the display, enabling a reader to click on words for additional information. Preferably, upon selecting the given word in the text, the pull down menu is generated with choices further defining the reader's interests. For example, such a pull-down menu may include sub-categories, such as the definition of the word, the meaning of the word in context, or, in the case of a pronoun or personal pronoun, information about a character in the story, such as a family tree or genealogy.

According to a yet a further aspect of the invention, when material of any kind is "read" to a user, be it the text of the electronic book itself or the recap/summary/auxiliary information, the invention may be used to automatically display images on the display screen associated with the material being read, to better understand, or to better enjoy, the electronic book. For example, when the text of the book or summary information is being read, the invention may be used to automatically generate an image of a narrator whose lips (or other body parts) move in accordance with the material being read. In more sophisticated embodiments, the text of the book may be analyzed in terms of content and images may be accessed and/or synthesized in accordance with subject matter.

As yet a further option, an electronic book according to the invention may be provided with a communications link or a short-range radio transmitter, such as a low-power FM transmitter, enabling a book which is presented as read out loud to instead be transmitted to a radio receiver in a car, for example, enabling all of the occupants thereof to enjoy the reading through a higher-quality audio system. In this particular embodiment, where there is dialog between two or more people, the electronic book preferably would automatically generate separated left- and right-channel audio, so that the listener would have the impression that the characters of the book are, in fact, separated by a physical distance during their conversation. Non-vocal sounds, such as thunder, crashes and other audio effects also should be introduced so as to appear to sound at the appropriate distance using this technique.

DETAILED DESCRIPTION OF THE INVENTION

Figure 1:
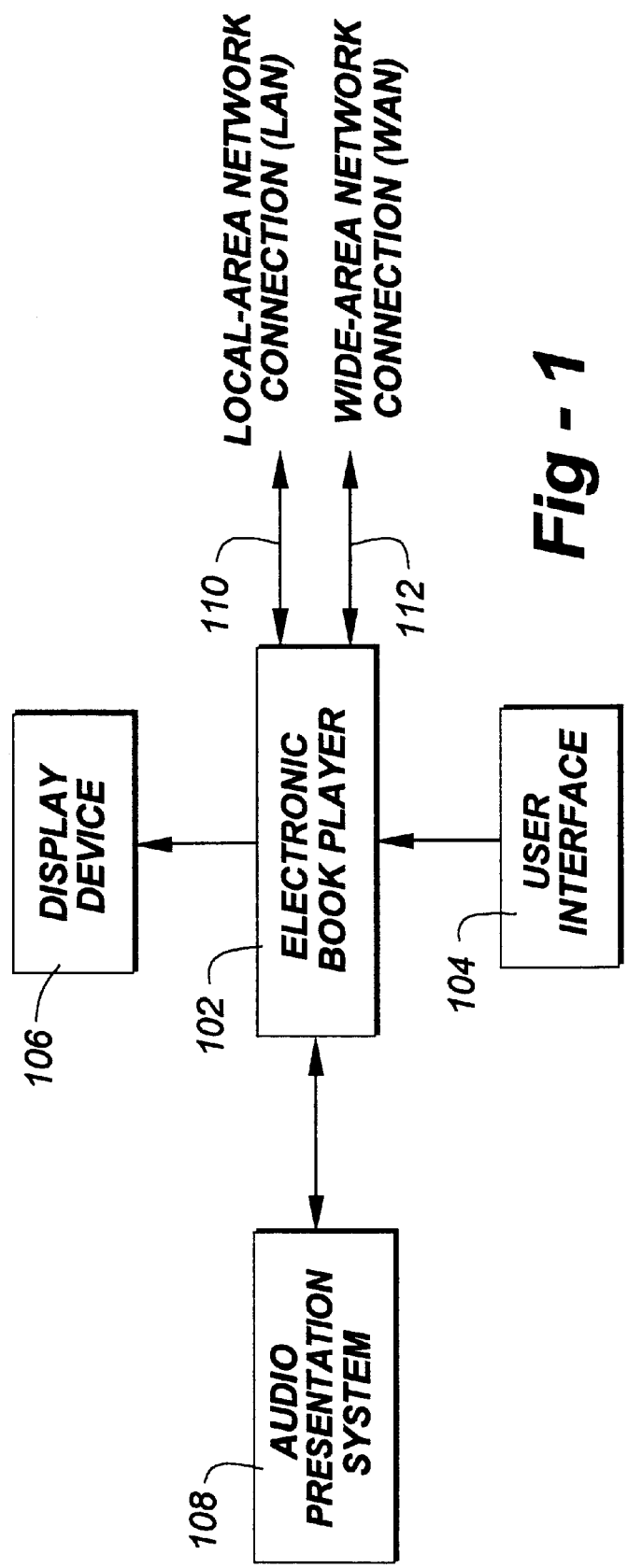
FIG. 1 shows an example of one possible implementation of the invention.

One problem with paper-based books is that when they are set down for a long period of time, it is difficult for a reader to remember details of the plot, who the characters are, and so forth, such that reference must often be made to previous chapters to recap what has happened. Similarly, there are cases where a reader is nearly finished or halfway through a book, and does not desire to finish the book, but would like to know how it ends.

According to one aspect of this invention, a user control is provided with facilities, either as a manual switch or soft key on the display, whereby a reader may have the electronic book provide a recap up to a point designated by the reader or, alternatively, allow the reader to "finish the book" by being provided with a summary, covering the material from a given point to the end. Such recap/summary information may be in the form of a displayed synopsis or spoken audio output.

The recap or summary material may either be furnished by the provider of the book itself in the electronic form or, alternatively, an intelligent algorithm may be used to automatically synthesize a summary of previously read or yet-to-be read material, based on analysis of the content. Programs of this kind are already available to provide abstracts of scientific papers, summary of electronic mail, and so forth. Since an automatically generated summary may be objectionable as inaccurate or distasteful to the author, a summary which is provided by the publisher, or supplied directly by the author is preferred, in which case such summaries preferably would be provided on a chapter by-chapter bases, although, for greater resolution, summaries on a per-page basis are also possible.

According to a different aspect of the invention, a pointing device such as a touch pad is provided along with curser on the display, enabling a reader to click on words for additional information. Preferably, upon selecting the given word in the text, the pull down menu is generated with choices further defining the reader's interests. For example, such a pull-down menu may include sub-categories, such as the definition of the word, the meaning of the word in context, or, in the case of a pronoun or personal pronoun, information about a character in the story, such as a family tree or genealogy. This might be particularly advantageous in for complex historical books and novels which span more than one generation, and often are based on lengthy and confusing family trees.

The invention is not limited in the way in which these recaps, summaries, or auxiliary information is provided. If the user does not wish to generate any sound, the information may be provided on the display itself in textual or graphical form or, alternatively, if the electronic book has an audio reading capability, the recap, summary, or auxiliary information may be "spoken to" the user. As with the textual delivery, the spoken delivery may either be provided, or downloaded, along with the reading material itself, or may be synthesized from the textual material utilizing, for example, automated text-to-speech conversion algorithms or hardware.

According to yet a further aspect of the invention, when material of any kind is "read" to a user, be it the text of the electronic book itself or the recap/summary/auxiliary information, the invention may be used to automatically display images on the display screen associated with the material being read, to better understand, or to better enjoy, the electronic book. For example, when the text of the book or summary information is being read, the invention may be used to automatically generate an image of a narrator whose lips (or other body parts) move in accordance with the material being read. As an option, a user may be able to specify a male, or female reader, along with male or female voice, and as a further option, the device may store images and voices of well-known narrators such as Charlton Heston, Stacy Keach, and so forth, so that a user not only may have the book read to them by a narrator on the display screen, but also may be able to choose a particular person from a stored library.

As a further option, the "reader" may be someone known to the person using the book, such as a mother or other friend or relative. In all such an implementation, at least the speaker's face is preferably digitized with different facial expressions and/or mouth movements, enabling the digitizations to be called up and displayed in accordance with the words being spoken. The prospective speaker(s) are also preferably asked to speak a predetermined set of words or sounds so that phonemes or other fundamental constructs may be used to synthesize the reading in that person's voice based upon the words being read.

The image and voice of the narrator may be stored in a complete or relatively complete form, or may be substantially synthesized by the device itself. For example, with a well-known narrator, a number of recorded slices of that person may be stored, each with a difference mouth opening, head position, blinking, and so forth, with the device automatically sequencing the slices to create a smooth appearance of talking in accordance with the words of the material being read.

Of course, with sufficient memory, an entire digital movie of the person actually reading the book may be played on the display in syndication with the words of the text. As a further alternative, a narrator or "talking head" may be synthesized entirely from graphical component parts, using very little memory, with text, speech again being used to synthesize a voice. By storing only a few of views of an individual, particularly with respect different mouth movements, a wide range of reader appearances may automatically be generated.

The invention is not limited to a single individual or simple graphics associated with a underlying electronic book, however. In more sophisticated embodiments, the text of the book may be analyzed in terms of content and images may be accessed and/or synthesized in accordance with subject matter. For example, in the case of a child's book without illustrations, sentences may, for example, be parsed into subject/object/verb, and images from a clip-art library, for example, may be assessed and moved onto the screen in accordance with actions implied by the book. For example, the "hippopotamus jumped for joy" may cause a simple clip-art figure of a hippopotamus, perhaps with its face changed to reflect a smile, to move up and down on the screen, with a synthesized background, to simulate a portion of the text.

For books for adults, on the other hand, more sophisticated images of people and places may be accessed or synthesized using graphically generation techniques, such as wire-frame and solids models, to simulate the content of a story. Again, so as not to be objectionable to the reader or the publisher, the publisher and/or author may collaborate to provide at least some of the images to be used in generating the graphics. The electronic book itself may be used to process these input images/movies and/or vocal constructs or, if the book is limited in terms of processing power, an external machine or web site may be used for processing to the results may be downloaded into the housing of the electronic book.

As yet a further option, an electronic book according to the invention may be provided with a communications link or a short-range radio transmitter, such as a low-power FM transmitter, enabling a book which is presented as read out loud to instead be transmitted to a radio receiver i a car, for example, enabling all of the occupants thereof to enjoy the reading through a higher-quality audio system. In this particular embodiment, where there is dialog between two or more people, the electronic book preferably would automatically generate separated left- and right-channel audio, so that the listener would have the impression that the characters of the book are, in fact, separated by a physical distance during their conversation. Non-vocal sounds, such as thunder, crashes and other audio effects also should be introduced so as to appear to sound at the appropriate distance using this technique.

FIG. 1 shows an example of one possible configuration of the various components which comprise the electronic book player system. The electronic book player unit 102 has a user interface 104, which may be physically located internal or external to the electronic book player unit 102. Similarly, a display device 106 may be located internal or external to the electronic book player 102.

An audio presentation system 108 provides playback of any audio signals produced by the electronic book player, and may be implemented as an internal amplifier and speakers, as an external amplifier and speakers, as headphones, or as any alternative using internal facilities or external facilities connected through a wired or wireless link. Additional facilities include an interface to a local area network 110 or a wide-area network 112. These network facilities may be utilized to retrieve book program material components, such as program text, graphical components, phoneme information, information describing characters and or narrators, or any type of data useful in the construction of the program audio, video, or graphics presentation.

Figure 2:
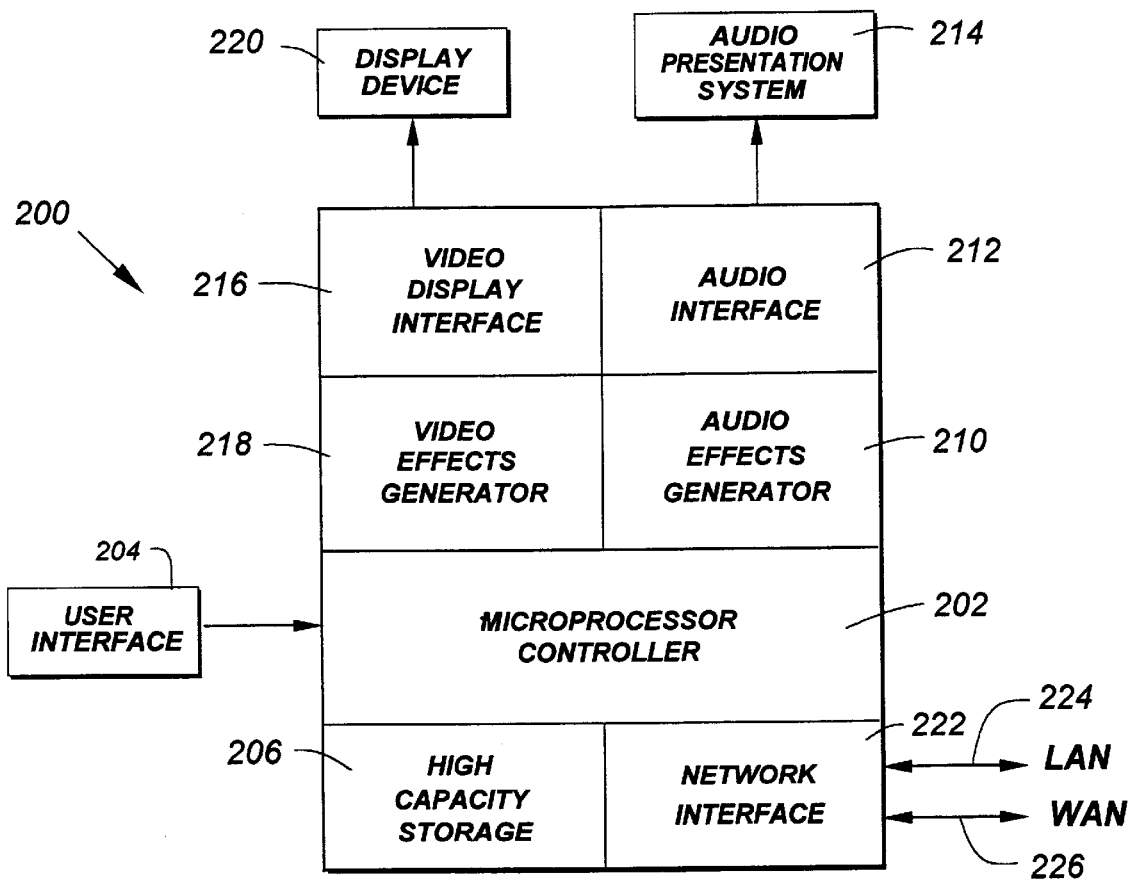
FIG. 2 shows a more detailed view of the functional components of the electronic book player unit.

FIG. 2 shows a more detailed view of the electronic book-player shown generally as 200. The components include a microprocessor controller 202 which provides the general processing, user interfacing, and specific program data processing. It also includes the usual components found in a personal computer motherboard, such as RAM and ROM memory, system BIOS, and so forth. The controller is connected to a user interface 204, which may be implemented internally or externally, and may include keyboards, "mouse" units, or similar interface devices.

The electronic book player preferably employs a high-capacity storage component 206, implemented as removable and/or non-removable storage, utilizing optical, magnetic, magneto-optical, semiconductor, or other storage devices. In practice, the storage may be as simple as a hard-disk drive, a CD-ROM player, or a plug-in module similar to the units commonly employed for consumer video-game systems. Alternatives would include any recordable medium, whether removable or non-removable.

The book program material components are implemented based on the type of content. For example, audio components, such as speech, music, sound effects, etc. are processed by the audio effects generator 210 and passed to the audio interface 214. These functions preferably are implemented using digital signal processing (DSP) components optimized for the type of data to be processed, such as audio data files, phenomes, actor data files (as explained herein below), and so forth. The audio presentation system 214 may be implemented using any convenient method, such as headphones, internal speakers, or an external stereo system.

Similarly, video and graphic program material components are implemented in the video effects generator 216, and passed to the video interface 218. As is the case for the audio components, these functions preferably are implemented using digital signal processing (DSP) components optimized for the type of data to be processed, such as video data files, graphic files, actor or prop data files (as explained herein below), and so forth. The video display 220 may be implemented using any convenient method, such as an internal liquid-crystal display, a video projection unit, or an alternative display device.

In the preferred embodiment, the various data book program material components may be received via a local area network (LAN) connection 224, or a wide-area network (WAN) connection 226. As an option, a link to a web site via the Internet could provide program material components at various levels of complexity and at different costs, ranging from free (or, included in the purchase price of the overall electronic book), or at a charge dependent on the specific features desired by the user. The internal or external data sources may include files which describe scenery, props, scene configuration, phenomes, the visual and audio characteristics of specific actors, the style and techniques of specific directors, or other data useful in the construction of the audio and video presentation of a specific scene.

As an example, the user might select the actors to play the parts (audio, video, or both), with the cost of the data files priced based on the popularity or skills of a particular actor. Thus, the portrayal of the character by a well-known actor might command a higher price than a portrayal by a newcomer-actor. In addition, the performance may be influenced by the selected actor, with a different interpretation by one actor than another. The performance of the cast as a whole may:even be adapted based on a user selection of the "director", with the actors interpreting their parts in light of the preferences and techniques of the director. In this way, the user may select the cast from among any actor available, and have the performance of that cast directed by the director selected by the user. Depending on the particular implementation, the data files obtained may be specific to a single book or series of books (such, as the "Sherlock Holmes" stories), or they may be applicable to any book to which an actor or director has been assigned.

Furthermore, data files also may be made available, based on data describing the scene props, furniture, scenery, or other background subject material. Based on user selections, the scene could be set in the desert or the jungle, or the furniture pieces set in a particular period or style, such as "French Provincial" or "Danish Modern", and the actor's costumes adjusted to a particular period or style, such as "the 50s" or "the 90s". The content of the data files would describe how to portray the props, costumes, etc. and even may be utilized to define the viewing angle of the user in the particular scene. In this sense, the audio and visual presentation would be fully aware of the three-dimensional aspects of the staging, the appearance of the actors and props, and all other aspects of the appearance of the scene.

Thus, the internal or external data sources may include files which describe scenery, props, scene configuration, phenomes, the visual and audio characteristics of specific actors, the style and techniques of specific directors, or other data useful in the construction of the audio and video presentation of a specific scene.

It will be appreciated that the various components depicted in FIG. 2 may be implemented internally to the electronic book player, externally to the electronic book player, or in any combination of internal and/or external components, and these components may be interconnected through internal data and address buses, external interfaces, or other interconnection methods as required for the particular configuration. Furthermore, these components may be located locally or remotely to each other, in any combination of local or remote location, in accordance with the invention.

We claim:

1. In an electronic book having a memory for storing the text of the book and a display for displaying text and graphics, the method of:

providing a recap of material already delivered to a user, a summary of material not yet delivered to a user, or auxiliary information about material being delivered to a user; and generating an image of a narrator on the display who delivers the recap, summary, or auxiliary information.

2. The method of claim 1, wherein the recap, summary, or auxiliary information are displayed or read to the user if the electronic book has an audio output capability.

3. The method of claim 1, wherein the recap, summary, or auxiliary information are stored in the electronic book, synthesized by the book, or a combination thereof.

4. In an electronic book having a memory for storing the text of the book, a display for displaying text and graphics, and an audio output device, the method of:

generating an image of a narrator on the display; and causing the text of the book to be heard through the audio output device in manner coordinated with the image of the narrator so as give a user the impression that the narrator is reading the book.

5. The method of claim 4, wherein the image of the narrator is derived from a known individual.

6. The method of claim 4, wherein the image of the narrator is computer-generated.

\* \* \* \* \*